(12) United States Patent
Sergeev

(10) Patent No.: US 12,025,709 B2
(45) Date of Patent: Jul. 2, 2024

(54) METHOD FOR DETERMINING AN ALIGNMENT OF AN OPTOELECTRONIC SENSOR BY MEANS OF SCAN POINTS OF A SENSOR IMAGE, AND OPTOELECTRONIC SENSOR

(71) Applicant: Valeo Schalter und Sensoren GmbH, Bietigheim-Bissingen (DE)

(72) Inventor: Nikolai Sergeev, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 911 days.

(21) Appl. No.: 17/052,641

(22) PCT Filed: Apr. 30, 2019

(86) PCT No.: PCT/EP2019/060992
§ 371 (c)(1),
(2) Date: Nov. 3, 2020

(87) PCT Pub. No.: WO2019/211254
PCT Pub. Date: Nov. 7, 2019

(65) Prior Publication Data
US 2021/0181352 A1 Jun. 17, 2021

(30) Foreign Application Priority Data
May 4, 2018 (DE) ................. 10 2018 110 775.7

(51) Int. Cl.
*G01S 17/931* (2020.01)
*G01S 7/481* (2006.01)
(Continued)

(52) U.S. Cl.
CPC .......... *G01S 17/931* (2020.01); *G01S 7/4817* (2013.01); *G01S 7/4972* (2013.01); *G05D 1/024* (2013.01)

(58) Field of Classification Search
CPC ........ G01S 7/40; G01S 7/4816; G01S 7/4817; G01S 7/486; G01S 7/4866; G01S 7/497;
(Continued)

(56) References Cited

U.S. PATENT DOCUMENTS 9,052,721 B1    6/2015  Dowdall et al.
11,714,193 B1 * 8/2023  Foster ............... G01S 7/4808
                                                356/4.01
(Continued)

FOREIGN PATENT DOCUMENTS

CN    103257342 A      8/2013
DE    102009046124 A1  5/2011
(Continued)

OTHER PUBLICATIONS

Notice of Reason for Rejection in corresponding Japanese Application No. 2020-561692, dated Oct. 1, 2021 (4 pages).
(Continued)

*Primary Examiner* — Yuqing Xiao
*Assistant Examiner* — Benjamin Richard Hebert
(74) *Attorney, Agent, or Firm* — Osha Bergman Watanabe & Burton LLP

(57) ABSTRACT

A method for determining at least one alignment of an optoelectronic sensor of a motor vehicle relative to the vehicle involves emitting light beams into surroundings of the vehicle by a transmitter device, and receiving light beams reflected at an object by a receiver unit of the sensor. The received light beams are represented as scan points in a sensor image of the surroundings of the vehicle generated by the optoelectronic sensor, and each scan point is assigned to
(Continued)

a receiver element. A sensor coordinate system is determined in the generated image using at least two received scan points of the first receiver element, and a reference coordinate system is determined in the generated image using at least one scan point of the first and second receiver elements. An angular deviation is determined by a comparison of the coordinate systems for determining the at least one alignment of the sensor.

14 Claims, 4 Drawing Sheets

(51) Int. Cl.
   *G01S 7/497* (2006.01)
   *G05D 1/00* (2024.01)
(58) Field of Classification Search
   CPC ...... G01S 7/4972; G01S 17/88; G01S 17/931; G05D 1/024; G05D 2201/0213
   See application file for complete search history.

(56) References Cited

U.S. PATENT DOCUMENTS

| | | | |
|---|---|---|---|
| 2003/0034913 A1* | 2/2003 | Asanuma | G01S 7/4056 342/72 |
| 2005/0034036 A1* | 2/2005 | Lages | G01S 17/89 714/100 |
| 2012/0140202 A1* | 6/2012 | Rothenberger | G06T 7/33 356/4.01 |
| 2016/0018524 A1* | 1/2016 | Zeng | G01S 17/87 356/4.01 |
| 2017/0082731 A1* | 3/2017 | Herbel | G01S 7/40 |
| 2018/0107221 A1* | 4/2018 | Droz | G05D 1/024 |
| 2018/0313942 A1* | 11/2018 | Wu | G01S 17/42 |
| 2019/0219697 A1* | 7/2019 | Castorena Martinez | G01S 17/86 |

FOREIGN PATENT DOCUMENTS

| | | | |
|---|---|---|---|
| DE | 102016010985 A1 | 3/2018 | |
| EP | 1557691 A1 | 7/2005 | |
| JP | 2001166051 A * | 6/2001 | ........... G01S 7/4026 |
| JP | 2010-287156 A | 12/2010 | |
| JP | 2016-120892 A | 7/2016 | |
| JP | 2016-206025 A | 12/2016 | |

OTHER PUBLICATIONS

International Search Report with Written Opinion in corresponding International Application No. PCT/EP2019/060992, dated Aug. 16, 2019 (11 pages).

* cited by examiner

METHOD FOR DETERMINING AN ALIGNMENT OF AN OPTOELECTRONIC SENSOR BY MEANS OF SCAN POINTS OF A SENSOR IMAGE, AND OPTOELECTRONIC SENSOR

The invention relates to a method for determining at least one angular position of an optoelectronic sensor of a motor vehicle. The optoelectronic sensor comprises a transmitter device, a receiver unit with at least two receiver elements, and an evaluation unit. The transmitter device is used to emit light beams into surroundings of the motor vehicle. The light beams reflected at an object are received by means of the receiver unit and represented as scan points in a sensor image generated by the optoelectronic sensor by means of the evaluation unit. Here, each scan point is assigned to a receiver element. Further, the invention relates to an optoelectronic sensor.

The prior art has already disclosed methods for detecting misalignments of lidar sensors. By way of example, U.S. Pat. No. 9,052,721 B1 discloses such a method. To this end, the lidar sensor supplies a 3D point cloud, which comprises scan points reflected on the ground and on at least one motor vehicle. The 3D point cloud is compared to a 3D reference point cloud and a misalignment of the lidar sensor is calculated.

It is an object of the present invention to develop a method and an optoelectronic sensor, by means of which at least one angular position of the optoelectronic sensor can be determined in an improved fashion.

This object is achieved by way of a method and an optoelectronic sensor in accordance with the independent claims.

One aspect of the invention relates to a method for determining at least one angular position of an optoelectronic sensor of a motor vehicle. The optoelectronic sensor comprises at least one transmitter device, at least one receiver unit and an evaluation unit. The method includes the following steps:
emitting light beams into surroundings of the motor vehicle by the transmitter device,
receiving light beams reflected at an object by means of the receiver unit, wherein the received light beams are represented by the evaluation unit as scan points in a sensor image of the surroundings of the motor vehicle generated by the optoelectronic sensor. Further, each scan point is assigned to a receiver element.

In the sensor image, a sensor coordinate system is determined using at least two scan points of the first receiver element of the receiver unit. Additionally, a reference coordinate system is formed using at least one scan point of the first receiver element and at least one scan point of the second receiver element. An angular deviation is determined by way of a comparison of the sensor coordinate system and the reference coordinate system for the purposes of determining the at least one alignment of the optoelectronic sensor.

In particular, this allows deviations of the alignment in the horizontal direction and in the vertical direction of the optoelectronic sensor of the motor vehicle to be determined. Consequently, it is possible to determine the at least one angular position of the optoelectronic sensor, in particular relative to the motor vehicle, by means of the method according to the invention. In particular, this allows an angular deviation or a misalignment of the optoelectronic sensor to be recognized and be corrected by means of the evaluation unit such that an improved operation of the optoelectronic sensor is facilitated. In particular, the optoelectronic sensor can be embodied as a lidar sensor or as a laser scanner.

According to one configuration, the at least two receiver elements are arranged along a vertical axis of the optoelectronic sensor. Consequently, the sensor image of the optoelectronic sensor, which is formed by the at least two receiver elements, can have at least two vertical planes. Here, the scan points of the first receiver element can form a first vertical plane and the scan points of the second receiver element can form a second vertical plane. In particular, as a result, the scan points of the first receiver element and the scan points of the second receiver element lie in at least two planes of the sensor image and, in particular, vertically above one another. As a result, it is possible to particularly easily generate the reference coordinate system and determine the angular deviation of the optoelectronic sensor and, accordingly, the at least one angular position.

In a further embodiment, a scan point straight line of the sensor image of the optoelectronic sensor is placed through at least two scan points of the first receiver element and the sensor coordinate system is determined by means of the scan point straight line. Should the optoelectronic sensor have no misalignment, the scan point straight line is, in particular, parallel to an axis that can be defined to be perpendicular to the optoelectronic sensor. If the scan point straight line has an angle with respect to the axis defined to be perpendicular to the sensor, a horizontal and/or vertical position of the sensor, in particular, is tilted. In particular, this angle can be determined by the evaluation unit and corresponds to the at least one angular deviation of the optoelectronic sensor, in particular relative to the motor vehicle. In particular, provision can be made for a scan point straight line of the first receiver element and a scan point straight line of the second receiver element to be generated in each case. In this way, it is possible to capture at least two angles for determining the angular deviation and the angular deviation can be determined by way of the mean value of the two captured angles. What can be exploited here is that the respective scan point straight lines of the first receiver element extend parallel to the respective scan point straight line of the second receiver element.

Likewise, provision can be made for the angular deviation to be determined as an angle between the scan point straight line and a reference straight line of the reference coordinate system. By way of example, the reference straight line can be a straight line that is aligned perpendicular to the optoelectronic sensor. Consequently, it is easily possible to determine a point of intersection between the scan point straight line and the reference straight line. Then, the angle between the scan point straight line and the reference straight line corresponds to the angular deviation of the optoelectronic sensor, in particular relative to the motor vehicle.

Furthermore, provision is made for the reference straight line to be placed through at least one of the scan points of the first receiver element and at least one of the scan points of the second receiver element and for the reference coordinate system to be determined by means of the reference straight line. To determine the reference straight line, it is possible, in particular, to use scan points of the first and the second receiver element which have the same horizontal angle. The horizontal angle, which can be assigned to a scan point, corresponds to the emission angle when emitting a light beam into the surroundings of the motor vehicle. This means that, within the scope of sequential scanning of solid angles, the solid angle at which the light beams were emitted in the respective scanning measurement can be assigned to a scan point in the sensor image. Here, the assumption can be made that, within a scanning measurement, the optoelectronic sensor can only receive light beams from the solid angle at which light beams were emitted. Placing the reference straight line through the scan points of the first and the second receiver element with the same horizontal angle is advantageous in that this straight line is always aligned perpendicular to a scanned surface, e.g., a roadway surface. Consequently, the reference coordinate system can be reliably generated even if an actual angular position of the optoelectronic sensor has an angular deviation from a target angular position. Provision can be made for reference straight lines to be determined for a multiplicity of scan points of the first and the second receiver element and for the angular deviation to be determined as a mean value of the angles between the reference straight line and the at least one scan straight line.

As a result, it is possible to determine the reference straight line by means of at least one scan point of the first receiver element and at least one scan point of the second receiver element and the reference coordinate system can be determined very easily and reliably. In particular, the respective reference straight lines extend parallel to one another if the scan point of the first reception element and the scan point of the second reception element have the same horizontal angle. As a result, the reference straight line can be determined more easily, even in the case of curves.

Likewise, provision is made for the optoelectronic sensor to comprise at least one third receiver element, by means of which light beams reflected at an object are received, and for the light beams to be represented by the evaluation unit as scan points of the third receiver element. The scan points of the third receiver element can also be taken into account when determining the sensor coordinate system and/or the reference coordinate system. In particular, the scan points of the third receiver element can be used to verify the scan point straight line and the reference straight line. Here, the scan points of the third receiver element can be used to determine a further angle, by means of which the at least one angular deviation can be determined in an improved fashion, in particular by forming a mean value of the individual angles. Additionally, further receiver elements can also be provided. In particular, this allows a reliable and more accurate determination of the angular position to be carried out.

According to a further configuration, the optoelectronic sensor is calibrated on the basis of the angular deviation. To this end, for example, the evaluation unit can be designed to determine the angular deviation and calibrate the optoelectronic sensor on the basis of the angular deviation. In particular, the misalignment of the optoelectronic sensor can be corrected by determining the angular position by means of the evaluation unit such that, when the optoelectronic sensor is used, it is possible to provide a corrected sensor image for the evaluation for further assistance systems. In particular, it is consequently possible to provide an improved optoelectronic sensor in the case of semi-autonomous, in particular autonomous, driving operation of the motor vehicle, it being possible to use said optoelectronic sensor reliably and safely in road traffic.

Likewise, provision is made for the at least one alignment to be determined during a driving operation of the motor vehicle. In particular, this can allow the current alignment of the optoelectronic sensor to be determined whilst driving and the optoelectronic sensor can be appropriately calibrated and corrected in any driving situation. In particular, the respective misalignment may vary in the case of different load states of the motor vehicle, for example. By determining the current alignment, it is possible to calibrate the optoelectronic sensor even in the case of different load states. As a result, the optoelectronic sensor can be operated better in a plurality of driving situations, and so the safety in road traffic can be improved for a multiplicity of different driving situations. In particular during an at least semi-autonomous operation of the motor vehicle, in particular during an autonomous operation thereof, this allows an improved recognition of a roadway guidance and/or of objects in the surroundings of the motor vehicle to be realized, as a result of which there can be increased safety in road traffic.

In a further embodiment, provision is made for static objects with a longitudinal extent, at least in sections, in relation to a vehicle longitudinal axis, which are recognized in the sensor image, to be used to determine the at least one alignment. Here, in particular, static objects which have a line-like or line-shaped structure in the sensor image can be used. By dividing the sensor image into at least two planes lying above one another, the scan points belonging to static objects with a longitudinal extent, at least in sections, in relation to a vehicle longitudinal axis can be divided into the at least two planes. Consequently, a partial line of the object can be imaged in each plane. If there is no angular deviation, the partial lines of a line-like or line-shaped structure can merge seamlessly into one another, to be precise parallel to the reference axis. If there is an angular deviation, i.e., the sensor is tilted, each partial line can have an angle with respect to the reference axis, wherein each partial line can have the same angle with respect to the reference axis. Advantageously, such static objects can be road markings and/or road safety barriers and/or walls, in particular tunnel walls. Road markings, in particular, can be suitable for determining the at least one alignment. Firstly, these can be present in most traffic scenarios and, secondly, road markings may contain strongly reflective particles in many countries. As a result of these particles, the road markings may have high reflectivity and may be captured particularly well by the optoelectronic sensor. Since in particular road safety barriers and/or walls, in particular tunnel walls, may likewise be aligned parallel to one another, these can also be used reliably for the method. In particular, this can also allow curves to be taken into account in the method.

In a further embodiment, a pitch angle of the optoelectronic sensor is determined as angular deviation. In particular, the pitch angle can be a rotation of the optoelectronic sensor about a transverse axis of the motor vehicle. By determining the angular deviation as a pitch angle, it is possible, in particular, to determine the rotation of the optoelectronic sensor about the transverse axis. Subsequently, this angular deviation of the optoelectronic sensor can be calibrated or corrected such that it is possible to provide a sensor image of the optoelectronic sensor which has been corrected by this pitch angle.

In an additional embodiment, a yaw angle of the optoelectronic sensor is determined as angular deviation. In particular, the yaw angle can be a rotation of the optoelectronic sensor about a vertical axis of the motor vehicle. By determining the angular deviation as a yaw angle, it is possible, in particular, to determine the rotation of the optoelectronic sensor about the vertical axis. Subsequently, this angular deviation of the optoelectronic sensor can be calibrated or corrected such that it is possible to provide a sensor image of the optoelectronic sensor which has been corrected by this yaw angle.

Furthermore, provision can be made for the yaw angle and the pitch angle to be determined as respective angular position. In the process, for example, the yaw angle can be determined on a first processor core of the optoelectronic sensor and the pitch angle can be determined on a second processor core of the optoelectronic sensor. Consequently, the yaw angle and the pitch angle can be determined in parallel on different processor cores. In particular, the evaluation unit is able to carry out a correction or a calibration of the optoelectronic sensor on the basis of the respectively determined yaw angle/pitch angle by way of the processor cores. As a result, the current yaw angle and the current pitch angle can be determined simultaneously, in a reliable and quick fashion and, in particular, during the driving operation of the motor vehicle. Consequently, the calibration of the optical sensor can be carried out reliably and safely and the safety in road traffic can be increased.

A further aspect of the invention relates to an optoelectronic sensor for a motor vehicle comprising at least one transmitter device for emitting light beams into surroundings of the motor vehicle, comprising at least one receiver unit with at least two receiver elements for receiving light beams reflected at an object and comprising an evaluation unit. The evaluation unit is embodied to represent the received light beams as scan points in a sensor image of the surroundings of the motor vehicle and to assign each scan point to a scan element. The evaluation unit is further embodied to determine a sensor coordinate system in the generated sensor image using at least two received scan points of the first receiver element and to determine a reference coordinate system in said generated sensor image using at least one scan point of the first receiver element and using at least one scan point of the second receiver element. The evaluation unit determines an angular deviation by way of a comparison of the sensor coordinate system and the reference coordinate system for the purposes of determining the at least one alignment of the optoelectronic sensor.

A further aspect of the invention relates to a motor vehicle comprising such an optoelectronic sensor.

Further features of the invention emerge from the claims, the figures and the description of the figures. The features and combinations of features that are cited in the description above, and also the features and combinations of features that are cited in the description of the figures below and/or are shown in the figures alone, can be used not only in the respectively indicated combination but also in other combinations or on their own without departing from the scope of the invention. Embodiments of the invention that are not explicitly shown and explained in the figures, but emanate and are producible from the explained embodiments by virtue of self-contained combinations of features, are therefore also intended to be regarded as included and as disclosed. Embodiments and combinations of features are also considered to be disclosed which therefore do not have all the features of an originally formulated independent claim. Embodiments and combinations of features that go beyond or differ from the combinations of features set out in the back-references of the claims should furthermore be considered to be disclosed, in particular by the embodiments set out above.

The invention will now be explained in more detail on the basis of preferred exemplary embodiments and with reference to the attached drawings.

The same reference signs are given in the figures to identify elements that are identical and have the same functions.

Figure 1:
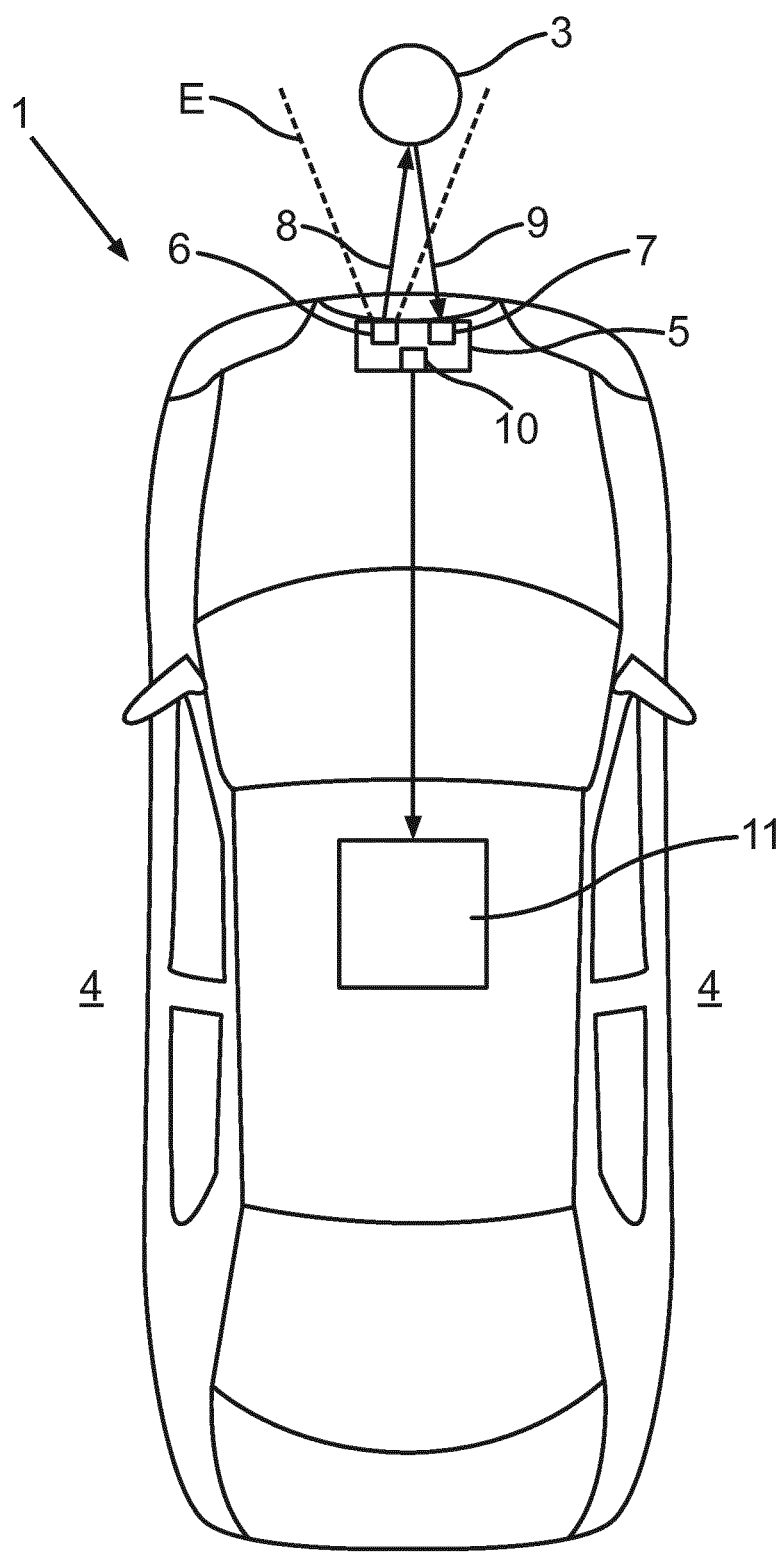
FIG. 1 shows a schematic plan view of a motor vehicle comprising an embodiment of an optoelectronic sensor.

FIG. 1 shows a motor vehicle 1 comprising a driver assistance system . An object 3 that is located in surroundings 4 of the motor vehicle 1. for example, can be captured by the driver assistance system. In particular, a distance between the motor vehicle 1 and the object 3 can be determined by means of the driver assistance system.

The driver assistance system comprises at least one optoelectronic sensor 5. The optoelectronic sensor 5 can be embodied as a lidar sensor or as a laser scanner. The optoelectronic sensor 5 comprises a transmitter device 6, by means of which light beams 8 can be emitted or sent out. In the present case, the optoelectronic sensor 5 is arranged at a front region of the motor vehicle 1. The optoelectronic sensor 5 can also be arranged at other regions, for example at a rear region or at a side region, of the motor vehicle 1.

The driver assistance system 2 comprises at least one optoelectronic sensor 5. The optoelectronic sensor 5 can be embodied as a lidar sensor or as a laser scanner. The optoelectronic sensor 5 comprises a transmitter device 6, by means of which light beams 8 can be emitted or sent out. In the present case, the optoelectronic sensor 5 is arranged at a front region of the motor vehicle 1. The optoelectronic sensor 5 can also be arranged at other regions, for example at a rear region or at a side region, of the motor vehicle 1.

The light beams 8 can be emitted by the transmitter device 6 within a predetermined capture range E or a predetermined angular range. By way of example, the light beams 8 can be emitted in a predetermined horizontal angular range. Moreover, the optoelectronic sensor 5 comprises a deflection device 13 not illustrated in FIG. 1 (see FIG. 2), by means of which the light beams 8 can be deflected into the surroundings 4 and hence the capture region E is scanned.

Moreover, the optoelectronic sensor 5 comprises a receiver unit 7, which may comprise a photodiode, for example. Using the receiver unit 7, the light beams 9 reflected by the object 3 can be received as a reception signal. Further, the optoelectronic sensor Scan comprise a control device, which may be formed by a microcontroller or a digital signal processor, for example. The optoelectronic sensor 5 can comprise an evaluation unit 10, by means of which the reflected light beams 9 can be evaluated as scan points 17A, 17B, 17C (see FIG. 3). The driver assistance system further comprises a control device 11 that can be formed, for example, by an electronic control unit (ECU) of the motor vehicle 1. The control device 11 is connected to the optoelectronic sensor 5 for data transfer. The data transfer can be implemented, for example, via the data bus of the motor vehicle 1.

Figure 2:
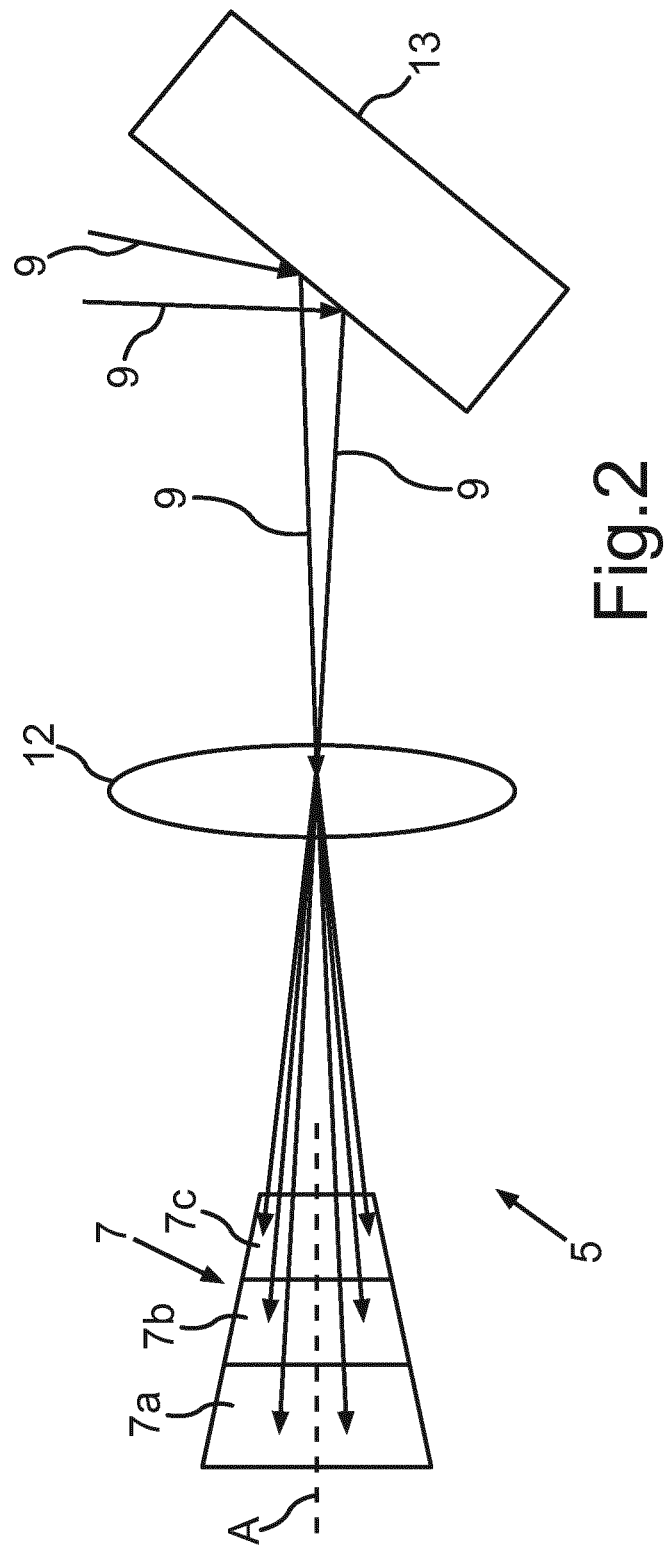
FIG. 2 shows a schematic view of the embodiment of the optoelectronic sensor.

FIG. 2 shows a schematic view of the optoelectronic sensor 5. The receiver unit 7 comprises a lens 12, by means of which the reflected light beams 9 can be focussed. The light beams 9 reflected at the object 3 are reflected to the lens 12 via the deflection unit 13. In the present case, the receiver unit 7 comprises a first receiver element 7a, a second receiver element 7b and a third receiver element 7c. The light beams 9 are reflected onto the receiver unit 7 in such a way that the light beams 9 can be received both in the first receiver element 7a, in the second receiver element 7b and in the third receiver element 7c. As a result, it is possible, in particular, for the object 3 to be captured within each of the receiver elements 7a, 7b, 7c. In particular, this renders it possible to compare the object 3 in the first receiver element 7a, in the second receiver element 7b and in the third receiver element 7c in each case in order to determine a misalignment, in particular an angular deviation.

The receiver elements 7a, 7b, 7c are arranged along a vertical axis A of the optoelectronic sensor 5. The sensor image 14 (see FIG. 3) of the optoelectronic sensor 5 has three planes, which are formed by the at least three receiver elements 7a, 7b, 7c. Consequently, scan points 17A of the first receiver element 7a are situated in the first plane, scan points 17B of the second receiver element 7b are situated in the second plane and the scan points 17C of the third receiver element 7c are situated in the third plane.

Figure 3:
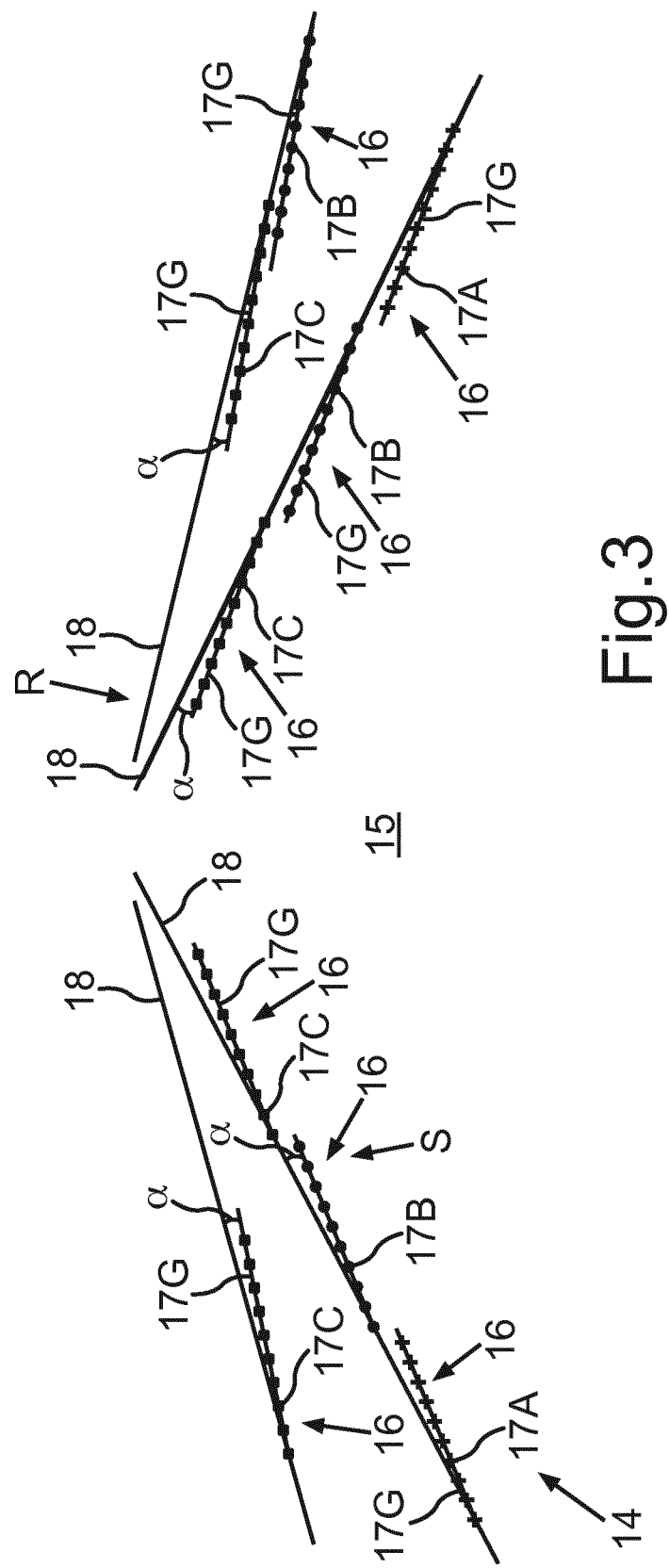
FIG. 3 shows a schematic view of a sensor image of the embodiment of an optoelectronic sensor.

FIG. 3 shows a schematic representation of the sensor image 14 of the optoelectronic sensor 5. FIG. 3 images the sensor image 14 of a roadway 15, on which the motor vehicle 1 is situated. The sensor image 14 contains road markings 16. In particular on account of their reflective nature, the road markings 16 are suitable for very advantageously reflecting the light beams 8 such that these can be received by the receiver unit 7. The light beams reflected at the road markings 16 are received within the sensor image 14 by the different receiver elements 7a, 7b, 7c. The evaluation unit 10 represents the received light beams as scan points 17A, 17B, 17C in the sensor image 14 and respectively assigns the scan points 17A, 17B, 17C to the corresponding receiver element 7a, 7b, 7c. The scan points 17A assigned to the first receiver element 7a are represented by plus signs in the present example, the scan points 17B assigned to the second receiver element 7b are represented by circles in the present case and the scan points 17C assigned to the third receiver element 7c are represented by squares in the present case.

Provision is made for a sensor coordinate system S to be determined by means of at least two of the scan points 17A of the first receiver element 7a of the receiver unit 7. As an alternative or in addition thereto, the sensor coordinate system S can also be determined by at least two scan points 17B of the second receiver element 7b and/or by at least two scan points 17C of the third receiver element 7c. In particular, provision can be made for a scan point straight line 17G of the sensor image 14 of the optoelectronic sensor 5 to be placed through the respective scan points 17A, 17B, 17C and for the sensor coordinate system S to be determined by means of the scan point straight lines 17G. As can be seen from FIG. 3, the scan point straight lines 17G, which were determined for the different receiver elements 7a, 7b, 7c, are aligned in parallel and consequently have the same horizontal angle.

A reference coordinate system R is determined using one of the scan points 17A of the first receiver element 7a and using one of the scan points 17B of the second receiver element 7b or alternatively or additionally using one scan point 17C. Depending on a selection of a scan point 17A of the first receiver element 7a, the scan point 17B of the second receiver element 7b and/or the scan point 17C of the third receiver element 7c is specified. Here, provision is made, in particular, for the scan points 17A, 17B, 17C to have the same solid angle or if, in terms of time, the first scan point 17A of the first receiver element 7a, which is assigned to the sensor image, is selected, then provision is made for, in terms of time, the first scan point 17B, 17C of the second and/or of the third receiver element 7b, 7c, assigned to the sensor image, to also be selected. The sensor coordinate system S is compared to the reference coordinate system R and, depending on the comparison, the at least one angular deviation of the optoelectronic sensor 5 is determined.

Further, provision is made for a reference straight line 18 to be placed through at least one of the scan points 17A of the first receiver unit 7a and a corresponding scan point 17B of the second receiver unit 7b and for the reference coordinate system R to be determined by means of the reference straight lines 18. In particular, provision is made for the angular deviation to be determined as an angle between the scan point straight line 17G and the reference straight line 18 of the reference coordinate system R. In particular, provision can be made for the angular deviation to be formed as a mean value of a multiplicity of angular deviations which, as described above, were determined by different scan points 17A, 17B, 17C of the different receiver elements 7a, 7b, 7c. The present example highlights, in particular, how a yaw angle a can be determined as an angular deviation, wherein the yaw angle a is, in particular, a rotation of the optoelectronic sensor 5 about the vertical axis Z.

Figure 4:
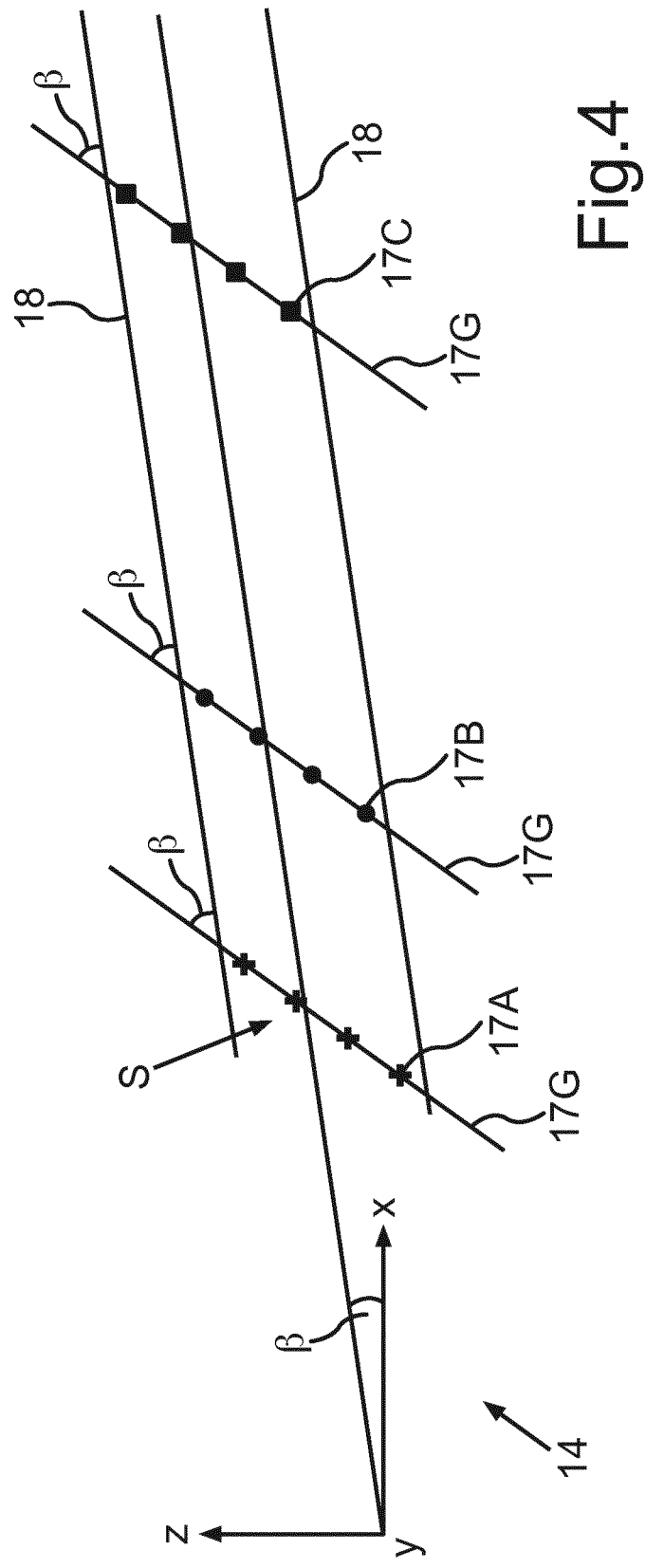
FIG. 4 shows a further schematic view of a sensor image of the embodiment of an optoelectronic sensor.

FIG. 4 shows a further schematic perspective view of the sensor image 14. In the present example, it is possible, in particular, to determine a pitch angle β of the optoelectronic sensor 5. The pitch angle β is, in particular, a rotation of the optoelectronic sensor 5 about a transverse axis Y. Further, the motor vehicle 1 can have a longitudinal axis X and a vertical axis Z. As can be seen in FIG. 4, the sensor coordinate system S can be determined by means of the scan point straight lines 17G of the scan points 17A, 17B, 17C. In particular, the reference straight lines 18 can be generated by respectively corresponding scan points 17A, 17B, 17C. In particular, the angular deviation between the scan point straight lines 17G and the reference straight lines 18 can then be determined as pitch angle β in the present case. By way of example, should a plurality of pitch angles β and/or yaw angles α be determined, the angular deviation can be determined, in particular, by way of a mean value of the individual pitch angles β and/or yaw angles α.

In particular, provision is made for the optoelectronic sensor 5 to be calibrated or corrected on the basis of the determined angular deviation. In particular, the evaluation unit 10 of the optoelectronic sensor 5 can determine the angular deviation to this end and transmit the latter, appropriately corrected, to the control device 11. In particular, this allows improved evaluation of the information of the optoelectronic sensor 5 to be made available for the control device 11, and so the safety in road traffic can be increased.

In particular, provision is made for the angular position α, β to be determined during a driving operation of the motor vehicle 1.

In particular, the scan points 17A, 17B, 17C can originate from the road markings 16 of the roadway 15, on which the motor vehicle 1 is located. However, scan points 17A, 17B, 17C from a road safety barrier and/or from a wall, in particular from a tunnel wall, of the roadway 15, on which the motor vehicle 1 is situated, are also possible.

Furthermore, it is possible that the yaw angle α and the pitch angle β are determined as respective angular deviation, wherein the yaw angle α can be determined on a first processor core of the optoelectronic sensor 5 and the pitch angle β can be determined on a second processor core of the optoelectronic sensor 5.

The invention claimed is:

1. A method for determining at least one alignment of an optoelectronic sensor of a motor vehicle relative to said motor vehicle, wherein the optoelectronic sensor comprises a transmitter device, a receiver unit with at least two receiver elements, and an evaluation unit, said method comprising:

emitting light beams into surroundings of the motor vehicle by the transmitter device;

receiving light beams reflected at an object by the receiver unit, wherein the received light beams are represented by the evaluation unit as scan points in a sensor image of the surroundings of the motor vehicle generated by the optoelectronic sensor, and each scan point is assigned to a receiver element;

determining a sensor coordinate system in the generated sensor image using at least two received scan points of the first receiver element; and determining a reference coordinate system in said generated sensor image using at least one scan point of the first receiver element and using at least one scan point of the second receiver element, wherein an angular deviation is determined by way of a comparison of the sensor coordinate system and the reference coordinate system for determining the at least one alignment of the optoelectronic sensor.

2. The method according to claim 1, wherein the at least two receiver elements are arranged along a vertical axis of the optoelectronic sensor and the sensor image of the optoelectronic sensor has at least two planes, wherein the first plane is formed by the scan points of the first receiver element and the second plane is formed by the scan points of the second receiver element.

3. The method according to claim 2, wherein a scan point straight line of the sensor image of the optoelectronic sensor is formed by at least two scan points of the first receiver element and the sensor coordinate system is determined by means of the scan point straight line.

4. The method according to claim 3, wherein the angular deviation is determined as an angle between the scan point straight line and a reference straight line of the reference coordinate system.

5. The method according to claim 1, wherein a reference straight line is formed by a scan point of the first receiver element and a scan point of the second receiver element, wherein the scan point of the second receiver element is specified by a selection of the scan point of the first receiver element, and the reference coordinate system is determined by means of the reference straight line.

6. The method according to claim 1, wherein the optoelectronic sensor comprises at least one third receiver element, by which light beams reflected at an object are received and the light beams are represented by the evaluation unit as scan points of the third receiver element in the sensor image, and at least one scan point of the third receiver element is also taken into account when determining the sensor coordinate system and/or the reference coordinate system.

7. The method according to claim 1, wherein the optoelectronic sensor is calibrated on the basis of the angular deviation.

8. The method according to claim 1, wherein the at least one alignment is determined during a driving operation of the motor vehicle.

9. The method according to claim 1, wherein static objects with a longitudinal extent, at least in sections, in relation to a vehicle longitudinal axis, which are recognized in the sensor image, are used to determine the at least one alignment.

10. The method according to claim 9, wherein the static objects are road markings and/or road safety barriers and/or walls of a tunnel.

11. The method according to claim 1, wherein a pitch angle of the optoelectronic sensor is determined as angular deviation.

12. The method according to claim 1, wherein a yaw angle of the optoelectronic sensor is determined as angular deviation.

13. An optoelectronic sensor for a motor vehicle comprising:

at least one transmitter device for emitting light beams into surroundings of the motor vehicle;

at least one receiver unit with at least two receiver elements for receiving light beams reflected at an object; and an evaluation unit, which is configured to:

represent the received light beams as scan points in a sensor image of the surroundings of the motor vehicle and to assign each scan point to a scan receiver element, determine a sensor coordinate system in the generated sensor image using at least two received scan points of the first receiver element, determine a reference coordinate system in said generated sensor image using at least one scan point of the first receiver element and using at least one scan point of the second receiver element, and determine an angular deviation a comparison of the sensor coordinate system and the reference coordinate system for determining the at least one alignment of the optoelectronic sensor.

14. A motor vehicle comprising an optoelectronic sensor according to claim 13.

* * * * *